(12) United States Patent
Chen

(10) Patent No.: US 10,230,307 B2
(45) Date of Patent: Mar. 12, 2019

(54) SHUNT DEVICE IN LIGHTING CONTROL SYSTEM WITHOUT NEUTRAL WIRE

(71) Applicant: KONINKLIJKE PHILIPS N.V., Eindhoven (NL)

(72) Inventor: Shangwu Chen, Wheeling, IL (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/384,708

(22) PCT Filed: Mar. 8, 2013

(86) PCT No.: PCT/IB2013/051866
§ 371 (c)(1),
(2) Date: Sep. 12, 2014

(87) PCT Pub. No.: WO2013/136241
PCT Pub. Date: Sep. 19, 2013

(65) Prior Publication Data
US 2015/0048753 A1     Feb. 19, 2015

Related U.S. Application Data

(60) Provisional application No. 61/611,237, filed on Mar. 15, 2012.

(51) Int. Cl.
  *H02M 5/22* (2006.01)
  *H05B 33/08* (2006.01)
  *H05B 37/02* (2006.01)
(52) U.S. Cl.
  CPC .......... *H02M 5/22* (2013.01); *H05B 33/0806* (2013.01); *H05B 37/02* (2013.01)

(58) Field of Classification Search
  CPC .... H05B 33/083; H05B 41/386; H05B 41/40; H05B 33/0806; H05B 33/0815;
  (Continued)

(56) References Cited

U.S. PATENT DOCUMENTS 3,873,905 A   3/1975 Marek
3,940,660 A   2/1976 Edwards
(Continued)

FOREIGN PATENT DOCUMENTS

CN      102056372 A    5/2011
JP      2010272456 A   12/2010
WO   WO2011013060 A1 *  2/2011   ......... H05B 33/0815

*Primary Examiner* — Haissa Philogene
(74) *Attorney, Agent, or Firm* — Akarsh P. Belagodu

(57) ABSTRACT

A device (340, 440, 540) is connected to an output terminal of a controller (330), having a single input terminal connected to a first power terminal of an external power source (305) which outputs an AC voltage between the first power terminal and a second power terminal. The device includes a bleeding circuit (342, 442, 542), and a switching arrangement (344/346, 444/446, 544/546) to detect whether the controller powers a load (320 or disables the load. When the controller is in an OFF state, the switching arrangement connects the bleeding circuit between the output terminal of the controller and the second power terminal to provide a current path between the output terminal of the controller and the second power terminal. When the controller is in an ON state, the switching arrangement disconnects the bleeding circuit between the output terminal of the controller and the second power terminal.

17 Claims, 6 Drawing Sheets

(58) Field of Classification Search
CPC ............ H05B 33/0821; H05B 33/0842; H05B 37/02; H05B 37/0281; H05B 37/0272; H02J 7/0063; H02J 2007/0095
See application file for complete search history.

(56) References Cited

U.S. PATENT DOCUMENTS

| | | | |
|---|---|---|---|
| 4,656,365 A | 4/1987 | Billings | |
| 4,833,339 A | 5/1989 | Luchaco et al. | |
| 4,874,962 A | 10/1989 | Hermans | |
| 8,723,431 B2* | 5/2014 | Deppe | H05B 33/0815 315/185 R |
| 8,829,805 B2* | 9/2014 | Thompson | H05B 41/3921 315/291 |
| 9,137,859 B2* | 9/2015 | Mituyasu | H05B 33/08 |
| 9,380,685 B2* | 6/2016 | Shet | H05B 33/0806 |
| 2003/0209997 A1* | 11/2003 | St-Germain | B61L 5/1881 315/291 |
| 2006/0250093 A1 | 11/2006 | Kumar | |
| 2007/0182338 A1* | 8/2007 | Shteynberg | H05B 33/0815 315/200 R |
| 2009/0224612 A1 | 9/2009 | Tsui et al. | |
| 2010/0090604 A1* | 4/2010 | Maruyama | H05B 33/0803 315/119 |
| 2011/0095700 A1* | 4/2011 | Kanamori | F21V 23/02 315/291 |
| 2012/0274216 A1* | 11/2012 | Datta | H05B 33/0815 315/127 |

* cited by examiner

SHUNT DEVICE IN LIGHTING CONTROL SYSTEM WITHOUT NEUTRAL WIRE

CROSS-REFERENCE TO PRIOR APPLICATIONS

This application is the U.S. National Phase application under 35 U.S.C. § 371 of International Application No. PCT/IB13/051866, filed on Mar. 08, 2013, which claims the benefit of U.S. Provisional Patent Application No. 61/611, 237, filed on Mar. 15, 2012. These applications are hereby incorporated by reference herein.

TECHNICAL FIELD

The present invention is directed generally to a lighting control system which does not employ a neutral wire, and, more particularly, to such a lighting control system which employs a shunt device to provide power flow to the control when the load is turned off.

BACKGROUND

In many conventional lighting arrangements, a mechanical wall switch is used to turn ON or OFF a lighting unit by means of making or breaking an electrical connection between a load that includes the lighting unit, and a "hot" wire carrying power from the AC mains power source. Accordingly, the mechanical wall switch does not need a connection to the neutral wire from AC mains in order to turn ON and OFF the lighting unit, but instead only has an input terminal for being connected to the "hot" wire carrying power from the AC mains power source, and output terminal for supplying this power to the load when the switch turns ON the lighting unit (for safety reasons, the mechanical wall switch may also have a ground wire which does not supply any power to the wall switch or the load and which is connected to earth ground). As a result, in many existing buildings, the neutral wire from the AC mains power source is not provided to the junction box or other location where the mechanical wall switch is provided, but instead only the "hot" wire, and a wire to the load, are provided to this location (again, for safety reasons, a ground wire which does not supply any power to the wall switch or the load may also be provided and connected to earth ground).

Here it is understood that the load may include one or more lighting units, each of which may include a lighting driver and one or more light sources, such as an incandescent lamp, a fluorescent lamp (such as a compact fluorescent bulb), one or more light emitting diodes (LEDs). The load also may or may not include a ballast.

As energy saving requirements become more stringent together with the need for intelligent lighting systems, more and more electronic controllers which employ electronic switching and dimming capabilities are deployed in place of simple mechanical wall switches in residential and commercial installations. The operation of such an electronic controller is similar to that of a mechanical wall switch, but due to the electronic circuit inside the lighting controller the electronic controller may execute additional functions such as switching on or off a relay, dimming, wireless communications, etc. So, unlike a simple mechanical wall switch, the electronic lighting controller requires some energy for proper operation.

However, if the electronic controller is connected in place of a mechanical wall switch in front of the load, the maximum available power for the electronic controller is determined by the leakage current and the characteristics of the load, which is in series with the electronic controller. In some cases, for example those involving a dimming ballast whose leakage current is very limited, there is not a sufficient leakage current passing through the electronic controller when the load is turned OFF to keep the electronic switch operating properly. As a result, the lighting system may not operate properly.

FIG. 1 is a wiring diagram for a conventional lighting control system 100 which illustrates the issue. Lighting control system 100 includes a load 120 and an electronic controller 130.

Load 120 may include one or more lighting units and/or a motor (e.g., for a room fan). The lighting unit(s) may include lighting units each may include a lighting driver and one or more light sources, such as an incandescent lamp, a fluorescent lamp (such as a compact fluorescent bulb), one or more light emitting diodes (LEDs), etc. Load 120 also may or may not include a ballast. Load 120 has the first load terminal and a second load terminal, and is configured to receive a load voltage between the first and second load terminals and is further configured to allow a load current to flow between the first and second load terminals.

Electronic controller 130 has a single input terminal connected via a wire (e.g., a black wire) to a first power terminal 110 of an external power source 105 (e.g., AC mains) which outputs an AC voltage between first power terminal 110 and a second power terminal (e.g., a neutral terminal) 112 thereof. Also shown is a ground wire (e.g., a green wire) 112 which is connected to earth ground and which does not supply any power to the electronic controller 130 or load 120. Electronic controller 130 also has a single output terminal which is connected by a wire (e.g., a red wire) to the first load terminal of load 120. The second load terminal of load 120 is connected by a wire (e.g., a neutral wire, which may be a white wire) to neutral terminal 112 of external power source 105.

When electronic controller 130 is in an ON state so as to power load 120, then load 120 can receive as its load voltage 100% of the input voltage supplied from external power source 105. When electronic controller 130 is in an OFF state so as to disable load 120, then the load voltage across load 120 will be zero.

However, since electronic controller 130 is an electrical device which requires power to operate, the situation can become complicated. When electronic controller 130 is in the ON state, if the load voltage across load 120 is 100% of the input voltage supplied from external power source 105, then the voltage across electronic controller 130 will be zero, and it couldn't remain in the ON state for long. Meanwhile, when electronic controller 130 is in the OFF state, there will be no load voltage across load 120 and no load current flowing through load 120. However this means that there will also be no current, or very little current, passing through electronic controller 130, so it cannot maintain the OFF state, either if it requires more energy.

To address these issues, some electronic controllers are designed to modulate the time intervals when they are in the ON and OFF states. When the electronic controller is in the ON state, it will switch to the OFF state for a little while, (e.g., OFF for 2 ms during every 10 ms ON period), so that during this interval the electronic controller can receive 100% of the input voltage supplied from external power source 105 and thereby power itself. Meanwhile, when the electronic controller is in OFF state, it maintains a small leakage current flowing through the load, and with such leakage current, the electronic controller can power itself as well.

But along with the technology development and more and more features like wireless communication required for lighting control, the power consumption of an electronic controller increases significantly, and the intrinsic leakage current of the load itself is not sufficient to power the electronic controller when it is in the OFF state.

FIG. 2 is a wiring diagram for another lighting control system 200 which has been provided to try to address this issue. Lighting control system 200 is identical to lighting control system 100, except that lighting control system 200 includes an external capacitor 210 connected across the load terminals of load 120. Whether electronic controller is in an ON state or an OFF state, external capacitor 210 can provide a leakage current path for electronic controller 130. The bigger the capacitor, the more leakage current can be delivered to electronic controller 130 to support activities consuming much current and power (e.g., receiving a wireless control signal).

However, if electronic controller 120 includes a TRIAC based device, also known as leading edge dimmer, then external capacitor 210 will cause catastrophic damage to TRIAC in terms of huge inrush current every cycle. Additionally, external capacitor 210 will shift the phase of voltage and current at the load side, making the phase cutting of the dimming operation out of control.

Thus, it would be desirable to provide a lighting control system which can supply a necessary leakage current to a controller when the controller is in an OFF state and disables a load whose power is supplied by the controller.

SUMMARY

The present disclosure is directed to inventive methods and apparatus for supplying a necessary leakage current to a controller when the controller is in an OFF state and disables a load whose power is supplied by the controller.

Generally, in one aspect a system comprises: an electronic controller and a shunt device. The electronic controller has a single input terminal connected to a first power terminal of an external power source which outputs an AC voltage between the first power terminal and a second power terminal thereof, and a single output terminal connected to a first load terminal of a load which includes at least one light source and which has the first load terminal and a second load terminal, wherein the second load terminal is connected to the second power terminal of the external power source, and wherein the load is configured to receive a load voltage between the first and second load terminals and is further configured to allow a load current to flow between the first and second load terminals, wherein the electronic controller is configured to control at least one of the load voltage and the load current so as to selectively power the load and disable the load. The shunt device comprises: a bleeding circuit; and a switching arrangement configured to selectively connect the bleeding circuit between the output terminal of the electronic controller and the second power terminal of the external power source. When the electronic controller is in an OFF state, the switching arrangement is configured to connect the bleeding circuit between the output terminal of the electronic controller and the second power terminal of the external power source to provide a current path between the output terminal of the electronic controller and the second power terminal of the external power source. When the electronic controller is in an ON state, the switching arrangement is configured to disconnect the bleeding circuit between the output terminal of the electronic controller and the second power terminal of the external power source.

In one embodiment, the switching arrangement includes: a switch in series with the bleeding circuit; and a voltage measurement device connected between the first and second load terminals and configured to measure the load voltage, and to close the switch to connect the bleeding circuit between the output terminal of the controller and the second power terminal of the external power source to provide the current path between the output terminal of the controller and the second power terminal of the external power source when the measured load voltage is less than a threshold voltage while the controller is in the OFF state, and to control the switch to open the switch to disconnect the bleeding circuit between the output terminal of the electronic controller and the second power terminal of the external power source when the measured load voltage exceeds the threshold voltage while the controller is in the ON state.

In another embodiment, the switching arrangement includes: a switch in series with the bleeding circuit; and a current measurement device configured to measure the load current and to close the switch to connect the bleeding circuit between the output terminal of the controller and the second power terminal of the external power source to provide the current path between the output terminal of the controller and the second power terminal of the external power source when the measured load current is less than a threshold current, and to control the switch to open the switch to disconnect the bleeding circuit between the output terminal of the electronic controller and the second power terminal of the external power source when the measured load current exceeds the threshold current.

According to one optional feature of this embodiment, the current measurement device is connected between the output terminal of the electronic controller and the first load terminal.

According to another optional feature of this embodiment, the current measurement device is connected between the second load terminal and the second power terminal of the external power source.

According to another embodiment, the electronic controller includes a dimming circuit for adjusting an amount of power supplied to the load.

According to yet another embodiment, the electronic controller includes a wireless receiver configured to receive a wireless signal and in response thereto to control an amount of power supplied to the load.

According to a still another embodiment, the second power terminal of the external power source is directly connected to the load.

According to a further embodiment, the second power terminal of the external power source is connected to the load via the switching arrangement.

According to a still further embodiment, the controller is installed in a building at a location where a connection to the second power terminal is not provided, and wherein the shunt device is separated and spaced apart from the controller by a distance of at least one foot.

According to yet a further embodiment, when the electronic controller transitions from the OFF state to the ON state, the switching arrangement is configured to disconnect the bleeding circuit between the output terminal of the electronic controller and the second power terminal of the external power source after a delay of at least 100 msec.

Generally, in another aspect, a method is provided for supplying power from an external power source which outputs an AC voltage between a first power terminal and a second power terminal thereof, to a load having first and second load terminals, wherein the load is configured to receive a load voltage between the first and second load terminals and is further configured to allow a load current to flow between the first and second load terminals, The method comprises: for a controller which is configured to control at least one of the load voltage and the load current so as to selectively power the load and disable the load, connecting a bleeding circuit between an output terminal of the controller and the second power terminal of the external power source when the controller is in an OFF state, the bleeding circuit providing a current path between the output terminal of the controller and the second power terminal of the external power source; and disconnecting the bleeding circuit between the output terminal of the controller and the second power terminal of the external power source when the controller is in an ON state.

In one embodiment, the method further comprises: measuring the load voltage; comparing the measured load voltage to a threshold voltage; connecting the bleeding circuit between the output terminal of the controller and the second power terminal of the external power source when the measured load voltage is less than the threshold voltage; and disconnecting the bleeding circuit between the output terminal of the electronic controller and the second power terminal of the external power source when the measured voltage exceeds the threshold voltage According to another embodiment, the method further comprises: measuring a current supplied to the load; comparing the measured load current to a threshold current; connecting the bleeding circuit between the output terminal of the controller and the second power terminal of the external power source when the measured load current is less than the threshold current; and disconnecting the bleeding circuit between the output terminal of the electronic controller and the second power terminal of the external power source when the measured load current exceeds the threshold current.

According to yet another embodiment, the controller is installed in a building at a location where a connection to the second power terminal is not provided, and wherein the bleeding circuit is separated and spaced apart from the controller by a distance of at least one foot.

According to a further embodiment, disconnecting the bleeding circuit between the output terminal of the controller and the second power terminal of the external power source when the controller is in an ON state comprises disconnecting the bleeding circuit between the output terminal of the controller and the second power terminal of the external power source when the controller after a delay of 100 msec, when the controller transitions from the OFF state to the ON state.

Generally, in yet another aspect, a device is configured to be connected to an output terminal of a controller, which in turn has a single input terminal connected to a first power terminal of an external power source which external power source outputs an AC voltage between the first power terminal and a second power terminal thereof. The device comprises: a bleeding circuit; and a switching arrangement configured to detect whether the controller powers a load or disables the load. The switching arrangement is configured to connect the bleeding circuit between the output terminal of the controller and the second power terminal of the external power source when the controller is in an OFF state such that the bleeding circuit provides a current path between the output terminal of the controller and the second power terminal of the external power source. The switching arrangement is further configured to disconnect the bleeding circuit between the output terminal of the controller and the second power terminal of the external power source when the controller is in an ON state.

According to one embodiment, the switching arrangement includes: a switch in series with the bleeding circuit; and a voltage measurement device connected between first and second load terminals and configured to measure the load voltage, and to close the switch to connect the bleeding circuit between the output terminal of the controller and the second power terminal of the external power source to provide a current path between the output terminal of the controller and the second power terminal of the external power source when the measured load voltage is less than a threshold voltage, and to control the switch to open the switch to disconnect the bleeding circuit between the output terminal of the controller and the second power terminal of the external power source when the measured load voltage exceeds the threshold voltage.

According to another embodiment, the switching arrangement includes: a switch in series with the bleeding circuit; and a current measurement device connected configured to measure the load current and to close the switch to connect the bleeding circuit between the output terminal of the controller and the second power terminal of the external power source to provide a current path between the output terminal of the controller and the second power terminal of the external power source when the measured load current is less than a threshold current, and to control the switch to open the switch to disconnect the bleeding circuit between the output terminal of the controller and the second power terminal of the external power source when the measured load current exceeds the threshold current.

According to yet another embodiment, the switching arrangement is configured to connect the second power terminal of the external power source to the load, the bleeding circuit may include or consist of a resistor.

According to a further embodiment, the controller is installed in a building at a location where a connect ion to the second power terminal is not provided, and wherein the shunt device is separated and spaced apart from the controller by a distance of at least one foot.

According to yet a further embodiment, when the electronic controller transitions from the OFF state to the ON state, the switching arrangement is configured to disconnect the bleeding circuit between the output terminal of the controller and the second power terminal of the external power source after a delay of at least 100 msec.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A "lighting driver" is used herein to refer to an apparatus that supplies electrical power to one or more light sources in a format to cause the light sources to emit light. In particular, a lighting driver may receive electrical power in a first format (e.g., AC mains power; a fixed DC voltage; etc.) and supplies power in a second format that is tailored to the requirements of the light source(s) (e.g., LED light source(s)) that it drives.

The term "lighting module" is used herein to refer to a module, which may include a circuit board (e.g., a printed circuit board) having one or more light sources mounted thereon, as well as one or more associated electronic components, such as sensors, current sources, etc., and which is configured to be connected to a lighting driver. Such lighting modules may be plugged into slots in a lighting fixture, or a motherboard, on which the lighting driver may be provided. The term "LED module" is used herein to refer to a module, which may include a circuit board (e.g., a printed circuit board) having one or more LEDs mounted thereon, as well as one or more associated electronic components, such as sensors, current sources, etc., and which is configured to be connected to a lighting driver. Such lighting modules may be plugged into slots in a lighting fixture, or a motherboard, on which the lighting driver may be provided.

The terms "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry; a lighting driver) relating to the operation of the light source(s). An "LED-based lighting unit" refers to a lighting unit that includes one or more LED-based light sources as discussed above, alone or in combination with other non LED-based light sources.

The terms "lighting fixture" and "luminaire" are used herein interchangeably to refer to an implementation or arrangement of one or more lighting units in a particular form factor, assembly, or package, and may be associated with (e.g., include, be coupled to and/or packaged together with) other components.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

In accordance with the understanding that a patent applicant may be his or her own lexicographer, as used herein a "two-wire connection" is specifically defined to be a connection which employs exactly two wires or terminals. A "two-wire connection" as used within the meaning of this specification and claims specifically does not include a connection which employs three (or more) wires.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

As discussed above, a controller for selectively supplying power to a load is often installed in a location where only one wire or connection is available to only one power terminal of an external power source which supplies power to the controller and load (i.e., the neutral wire is provided to the controller). In these installations, there is no return current path from the controller to the external power source, other than through the load itself. Therefore there is a need to provide a return current path for the controller when the controller is in an OFF state and the load is disabled.

Therefore, Applicant has recognized and appreciated that it would be beneficial to provide a bypass current path between the output terminal of the controller and a second power terminal of the external power source when the controller is in an OFF state and disables the load. It would also be beneficial to disconnect or disable the bypass current path between the output terminal of the controller and the second power terminal of the external power source when the controller is on an ON state and powers the load. This may prevent wasted power consumption in the bypass current path when the controller is on an ON state and powers the load.

In view of the foregoing, various embodiments and implementations of the present invention are directed to a shunt device which can be connected to an output terminal of a controller and which can provide a bypass current path between the output terminal of the controller and a second power terminal of the external power source when the controller is in an OFF state and disables the load. Other embodiments and implementations are directed to a lighting control arrangement that includes such a shunt device. Sill other embodiments and implementations are directed to a method which enables a bypass current path between the output terminal of the controller and a second power terminal of the external power source when the controller is in an OFF state and disables the load, and which disconnects or disables the bypass current path between the output terminal of the controller and the second power terminal of the external power source when the controller is on an ON state and powers the load.

Figure 1:
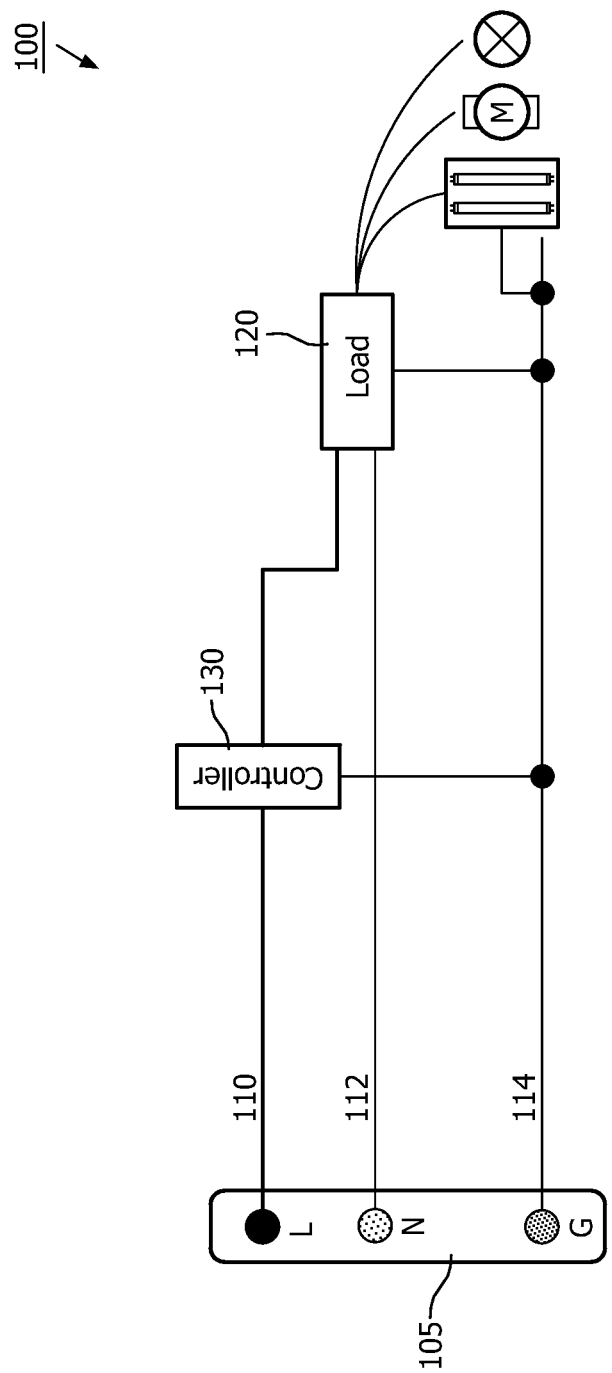
FIG. 1 is a wiring diagram for a conventional lighting control system
Figure 2:
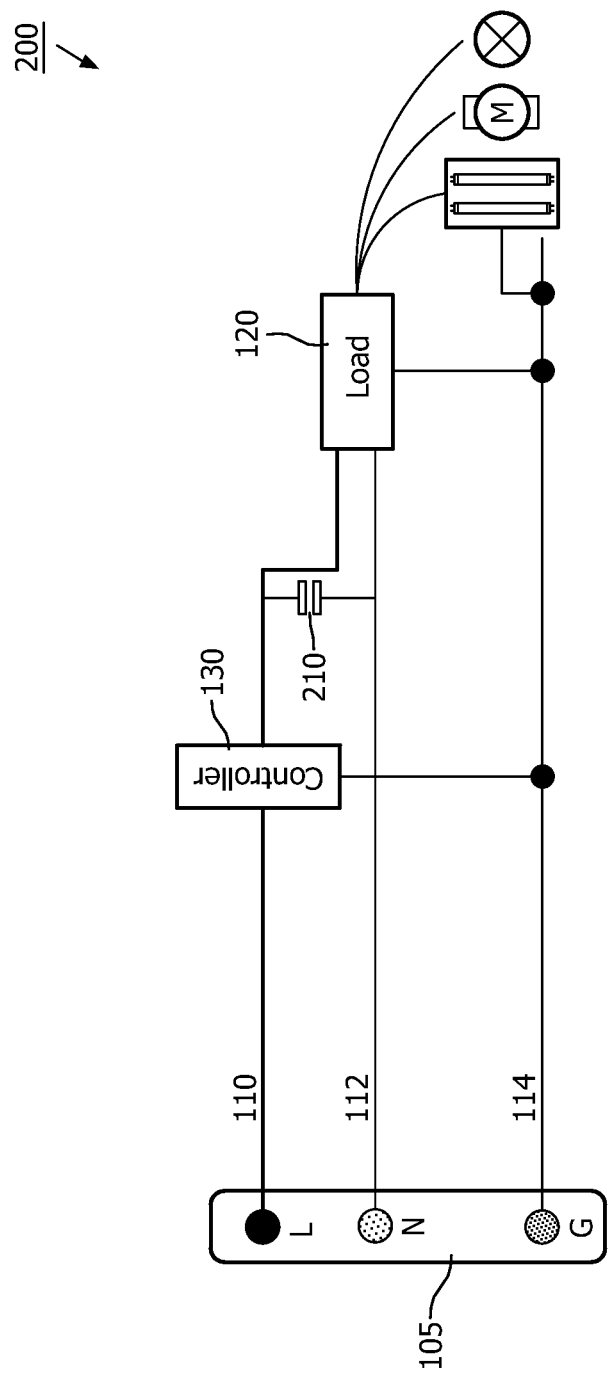
FIG. 2 is a wiring diagram for another conventional lighting control system.
Figure 3:
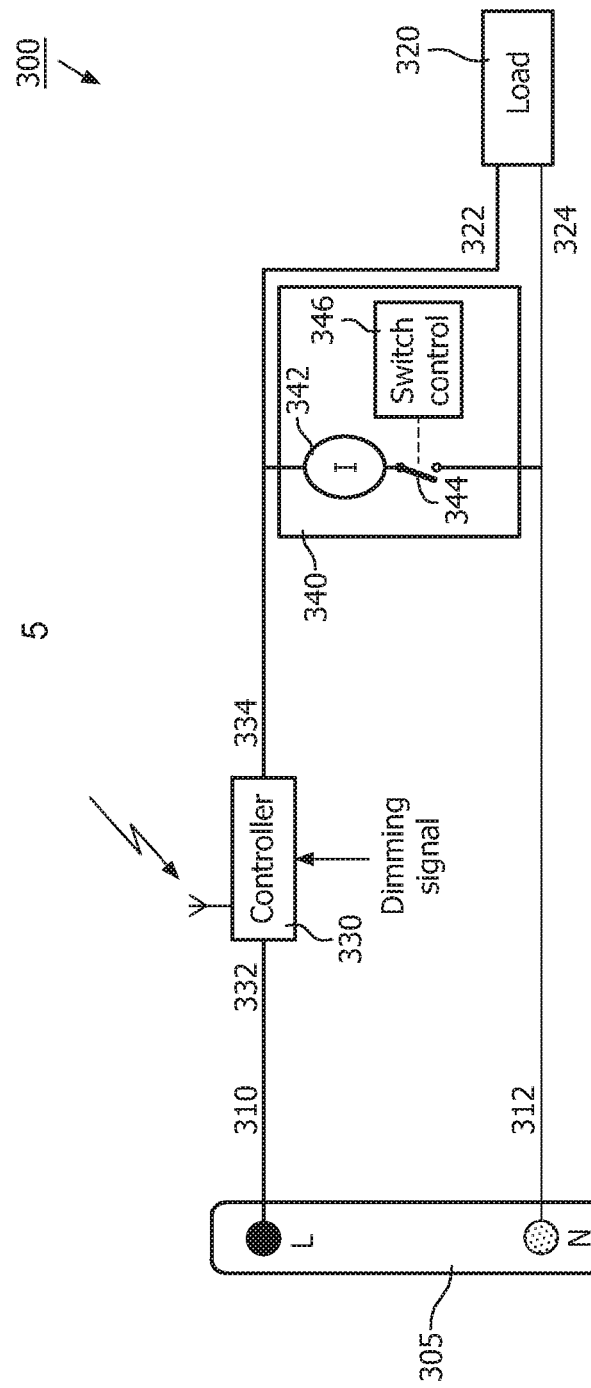
FIG. 3 is a wiring diagram for one embodiment of a lighting control system having a controller which does not employ a neutral wire, according to the invention

FIG. 3 is a functional block diagram of one embodiment of a lighting control system 300 having a controller 330 which does not employ a neutral wire. System 300 includes a load 320, controller 330, and shunt device 340.

Load 320 may include one or more lighting units and/or a motor (e.g., for a room fan). The lighting unit(s) may include lighting units each may include a lighting driver and one or more light sources, such as an incandescent lamp, a fluorescent lamp (such as a compact fluorescent bulb), one or more light emitting diodes (LEDs), etc. Load 320 also may or may not include a ballast. Load 320 has the first load terminal 322 and a second load terminal 324, and is configured to receive a load voltage between first and second load terminals 322 and 324 and is further configured to allow a load current to flow between first and second load terminals 322 and 324.

Controller 330 has a single input terminal 332 connected via a wire (e.g., a black wire) to a first power terminal 310 of an external power source 305 (e.g., AC mains) which outputs an AC voltage between first power terminal 310 and a second power terminal (e.g., neutral terminal) 312 thereof. A ground wire (not shown) which is connected to earth ground and which does not supply any power to controller 330 or load 320 may also be provided for safety reasons. Controller 330 also has a single output terminal 334 which is connected by a wire (e.g., a red wire) to first load terminal 322 of load 320. Second load terminal 324 of load 320 is connected by a wire (e.g., a neutral wire, which may be a white wire) to second (e.g., neutral) power terminal 312 of external power source 305.

In some embodiments of lighting control system 300, controller 330 may be installed in a junction box or a wall of a building 5 and may be located remotely (e.g., by a distance D (see FIG. 4) of one foot to several feet) from load 320. In some embodiments, a connection to second (e.g., neutral) power terminal 312 of external power source 305 is not provided to or available at the location where controller 330 is installed or disposed, and only a connection to first power terminal 310 is available (e.g., through a so-called "hot" wire). In some embodiments, shunt device 340 may be co-located together with load 320. In some embodiments, shunt device 340 may be provide inside of a lighting fixture, or housed together with a lighting device comprising load 320.

In some embodiments, controller 330 is an electronic controller which includes a dimming circuit for adjusting an amount of power supplied to load 320 in response to a dimming signal (which may be, e.g., a setting of a dimming knob or slide-control of controller 330 which may be adjusted by a user). In some embodiments, controller 330 includes a wireless receiver configured to receive a wireless signal which includes data and/or commands for controller 330 to control the amount of power supplied to load 320.

Shunt device 340 is connected to output terminal 334 of controller 330, and is connected to second (e.g., neutral) terminal 312 of external power source 305 via a wire (e.g., a neutral wire, which may be a white wire). Shunt device 340 includes a bleeding circuit 342, a switching arrangement that includes a switch 344 and a switch control 346. In some embodiments, bleeding circuit 342 may consist of a resistor, for example a 1 k·resistor. In some embodiments, switch 344 may comprise a transistor switch, for example afield effect transistor (FET), and particularly a metal oxide semiconductor field effect transistor (MOSFET). Beneficially, in some embodiments switch 344 is configured to have a switching time of less than 10 milliseconds.

Operationally, electronic controller 330 is configured to control at least one of the load voltage and the load current so as to selectively power the load and disable load 320. As described above, controller 330 may control the load voltage and/or load current in response to a dimming input (e.g., by a knob or slider manipulated by a user), in response to a wireless control signal, etc.

Switch control 346 is configured to determine when electronic controller 330 is in an OFF state, disabling load 320. When switch control 346 determines that electronic controller 330 is in an OFF state, disabling load 320, then the switching arrangement, and particularly switch 344, may connect bleeding circuit 342 between output terminal 334 of electronic controller 330 and second power (e.g., neutral) terminal 312 of external power source 305 to provide a leakage current path between output terminal 334 of electronic controller 330 and the second power (e.g., neutral) terminal 312 external power source 305. Also, beneficially, when switch control 346 determines that electronic controller 330 is in an ON state powering load 320, then the switching arrangement, and particularly switch 344, is configured to disconnect bleeding circuit 342 from between output terminal 334 of electronic controller 330 and second power (e.g., neutral) terminal 312 of external power source 305. In some embodiments, when electronic controller 330 switches to the ON state, switch 344 may be switched off immediately to disconnect the path including bleeding circuit 342. However, some lamp drivers in some loads 330 may not be able to draw enough current during the initial ON phase to keep electronic controller 330 operating properly because they may need some time (e.g., 100 milliseconds) to ignite the lamp. Accordingly, in some embodiments, switch 344 may be switched off after a short delay until load 320 is in full conduction and able to draw enough current for controller 330.

Figure 4:
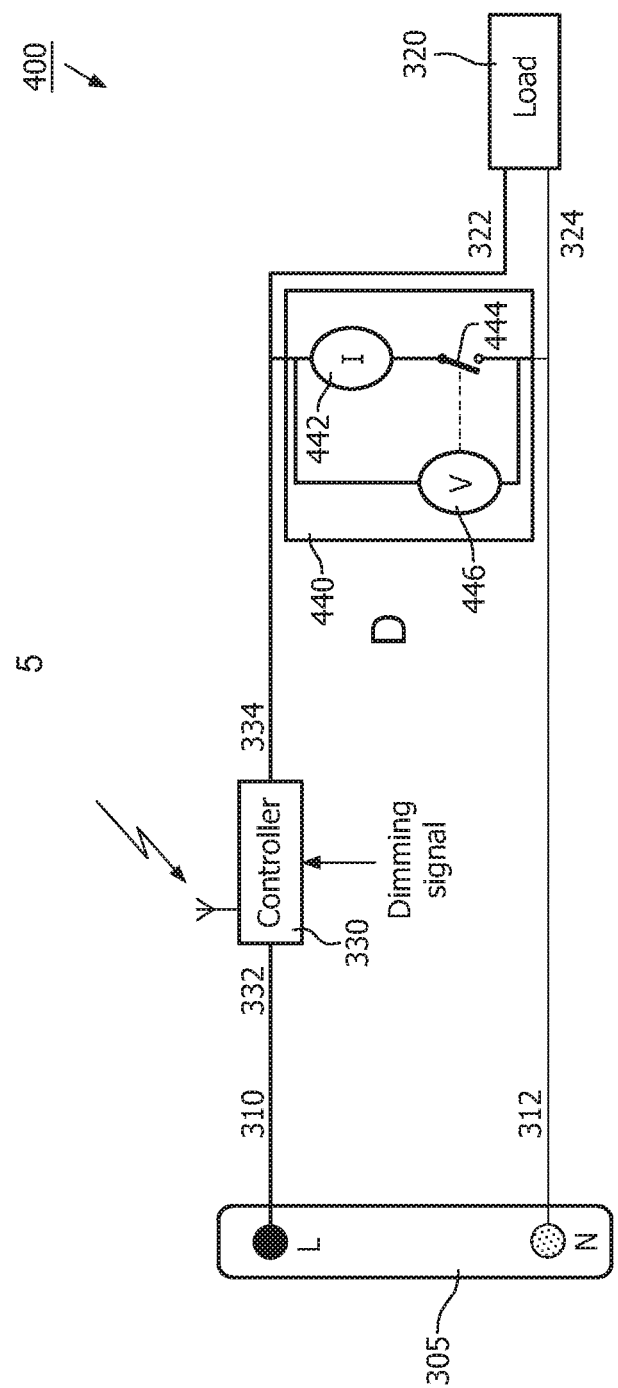
FIG. 4 is a wiring diagram for a second embodiment of a lighting control system having a controller which does not employ a neutral wire, according to the invention

FIG. 4 is a functional block diagram of a second embodiment of a lighting control system 400 having a controller which does not employ a neutral wire. Lighting control system is the same as lighting control system 300, except that shunt device 440 replaces shunt device 340. Shunt device 440 may be one embodiment of shunt device 340.

As with lighting control system 300, in some embodiments of lighting control system 400 controller 330 may be installed in a junction box or a wall of a building and may be located remotely from (e.g., by a distance of one foot to several feet) from load 320. In some embodiments, a connection to second (e.g., neutral) power terminal 312 of external power supply 305 is not provided to or available at the location where controller 330 is installed or disposed, and only a connection to first power terminal 310 is available (e.g., through a so-called "hot" wire). In some embodiments, shunt device 440 may be co-located together with load 320. In some embodiments, shunt device 440 may be provide inside of a lighting fixture, or housed together with a lighting device comprising load 320.

Shunt device 440 is connected to output terminal 334 of controller 330, and to second (e.g., neutral) terminal 312 of external power supply 305 via a wire (e.g., a neutral wire, which may be a white wire). Shunt device 440 is also connected across load terminals 322 and 324 of load 320. Shunt device 340 includes a bleeding circuit 442, a switching arrangement that includes a switch 444 and a voltage measurement device (e.g., an op amp) 446. In some embodiments, bleeding circuit 442 may consist of a resistor, for example a 1 k·resistor. In some embodiments, switch 444 may comprise a transistor switch, for example afield effect transistor (FET), and particularly a metal oxide semiconductor field effect transistor (MOSFET). Beneficially, in some embodiments switch 444 is configured to have a switching time of less than 10 milliseconds.

Operationally, shunt device 440 is configured to determine when electronic controller 330 is in an OFF state, disabling load 320. For example, shunt device 440 may determine that electronic controller 330 is in an OFF state when the load voltage applied to load 320 is less than a minimum dimming voltage. When switch control 344 determines that electronic controller 330 is in an OFF state, disabling load 320, then the switching arrangement, and particularly switch 444, may connect bleeding circuit 442 between output terminal 324 of electronic controller 330 and second power (e.g., neutral) terminal 312 of external power source 305 to provide a leakage current path between the output terminal of electronic controller 330 and the second power (e.g., neutral) terminal 312 external power source 305. Also, beneficially, when shunt device 440 determines that electronic controller 330 is in an ON state powering load 320, then the switching arrangement, and particularly switch 444, is configured to disconnect bleeding circuit 442 from between output terminal 324 of electronic controller 330 and second power (e.g., neutral) terminal 312 of external power source 305.

More specifically, when controller 330 is in the OFF state, the load voltage across load terminals 322 and 324 of load 320 would be expected to be zero, but because of the leakage current passing through the loop, the load voltage may oscillate and be charged up to as high as 100% of the input voltage from external power source 305 at a certain time. However, the power is very limited, so if switch 444 connects bleeding circuit 442 across load 320 at the moment when the load voltage is charged to certain threshold value, for example 50% of the input voltage from external power source 305 (e.g., 56 volts), the leakage voltage will drop significantly and it could never be charged up to 100 % of the input voltage. So in this way, shunt device 440 can maintain the load voltage at a low level when controller 330 is in the OFF state and avoid an accidental start up of load 320, and furthermore, it can pass more leakage current to controller 330 to support its higher power consumption.

When controller 330 is in the ON state, at first shunt device 440 will try to dissipate the power and reduce the load voltage at the moment when the load voltage drops below a threshold, e.g. 50% of the input voltage from external power source 305 (e.g., 56 volts), but because this voltage is not induced by the leakage current as when controller 330 is in the OFF state, the load voltage can't be pulled down, and it will keep on rising. When it hits and exceeds a higher threshold, for example 70% of the input voltage from external power source 305, shunt device 440 will recognize that controller is in the ON state and it will then deactivate or disconnect bleeding circuit 442 via switch 444, and stop trying to dissipate power. Subsequently, the enabled load 320 passes current through controller 330 to power it.

Figure 5:
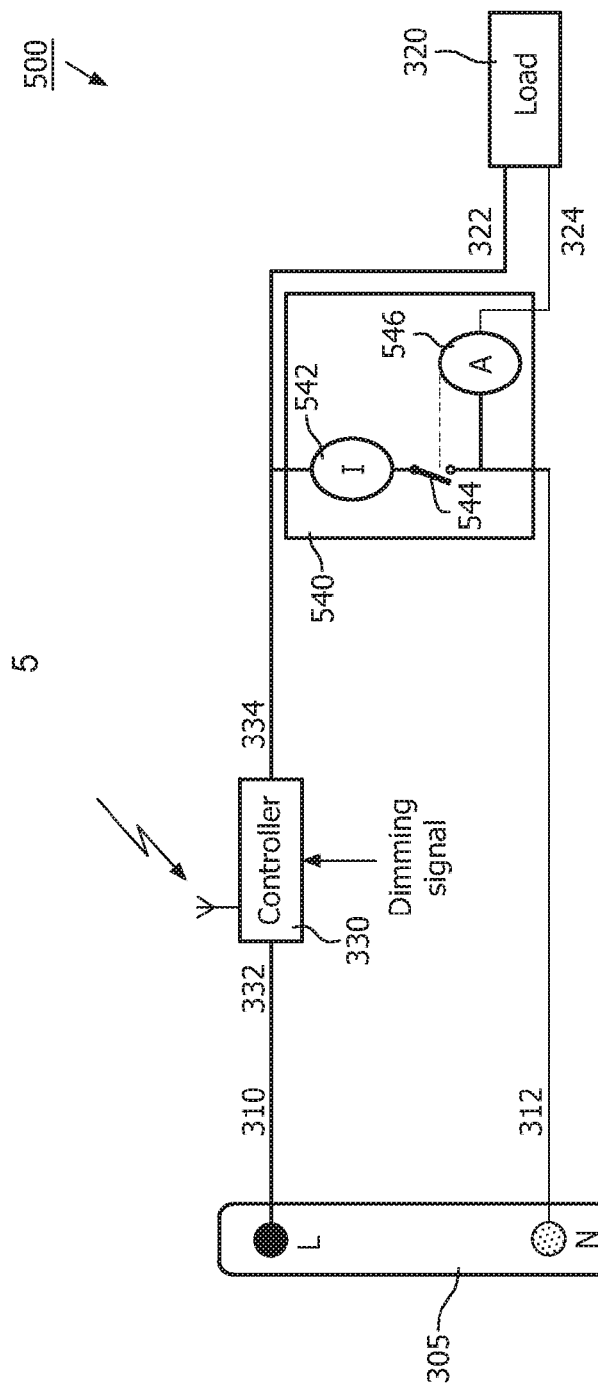
FIG. 5 is a wiring diagram for a third embodiment of a lighting control system having a controller which does not employ a neutral wire, according to the invention

FIG. 5 is a functional block diagram of a third embodiment of a lighting control system having a controller which does not employ a neutral wire. Lighting control system is the same as lighting control system 300, except that shunt device 540 replaces shunt device 340. Shunt device 540 may be one embodiment of shunt device 340.

As with lighting control system 300, in some embodiments of lighting control system 500 controller 330 may be installed in a junction box or a wall of a building and may be located remotely from (e.g., by a distance of one foot to several feet) from load 320. In some embodiments, a connection to second (e.g., neutral) power terminal 312 of external power source 305 is not provided to or available at the location where controller 330 is installed or disposed, and only a connection to first power terminal 310 is available (e.g., through a so-called "hot" wire). In some embodiments, shunt device 540 may be col-located together with load 320. In some embodiments, shunt device 540 may be provide inside of a lighting fixture, or housed together with a lighting device comprising load 320.

Shunt device 540 is connected to output terminal 334 of controller 330, and to second (e.g., neutral) terminal 312 of external power source 305 via a wire (e.g., a neutral wire, which may be a white wire). Shunt device 540 is also connected to a second load terminal 324 of load 320. Shunt device 540 includes a bleeding circuit 542, a switching arrangement that includes a switch 544 and a current measurement device 546. In some embodiments, bleeding circuit 542 may consist of a resistor, for example a 1 k·resistor. In some embodiments, switch 544 may comprise a transistor switch, for example afield effect transistor (FET), and particularly a metal oxide semiconductor field effect transistor (MOSFET). Beneficially, in some embodiments switch 544 is configured to have a switching time of less than 10 milliseconds.

Operationally, shunt device 540 is configured to determine when electronic controller 330 is in an OFF state, disabling load 320. When shunt device 540 determines that electronic controller 330 is in an OFF state, disabling load 320, then the switching arrangement, and particularly switch 544, may connect bleeding circuit 542 between output terminal 334 of electronic controller 330 and second power (e.g., neutral) terminal 312 of external power source 305 to provide a leakage current path between output terminal 334 of electronic controller 330 and the second power (e.g., neutral) terminal 312 external power source 305. Also, beneficially, when shunt device 540 determines that electronic controller 330 is in an ON state powering load 320, then the switching arrangement, and particularly switch 544, is configured to disconnect bleeding circuit 542 from between the output terminal of electronic controller 330 and second power (e.g., neutral) terminal 312 of external power source 305.

In some embodiments, current measurement device 546 may measure the load current and compare it to a threshold current, and when the load current is less than the threshold current then shunt device 540 may determine that controller 330 is in an OFF state, and may control switch 544 to connect bleeding circuit 542 between output terminal 334 of electronic controller 330 and second power (e.g., neutral) terminal 312 of external power source 305 to provide a leakage current path between output terminal 334 of electronic controller 330 and the second power (e.g., neutral) terminal 312 external power source 305. In some embodiments, when the load current is greater than the threshold current then shunt device 540 may determine that controller 330 is in an ON state, and may control switch 544 to disconnect bleeding circuit 542 from between output terminal 334 of electronic controller 330 and second power (e.g., neutral) terminal 312 of external power source 305.

In lighting control system 500, current measurement device 546 is connected between second load terminal 324 and second power (e.g., neutral) terminal of external power source 305, to which it may be connected by a wire (e.g., a neutral wire or white wire).

Figure 6:
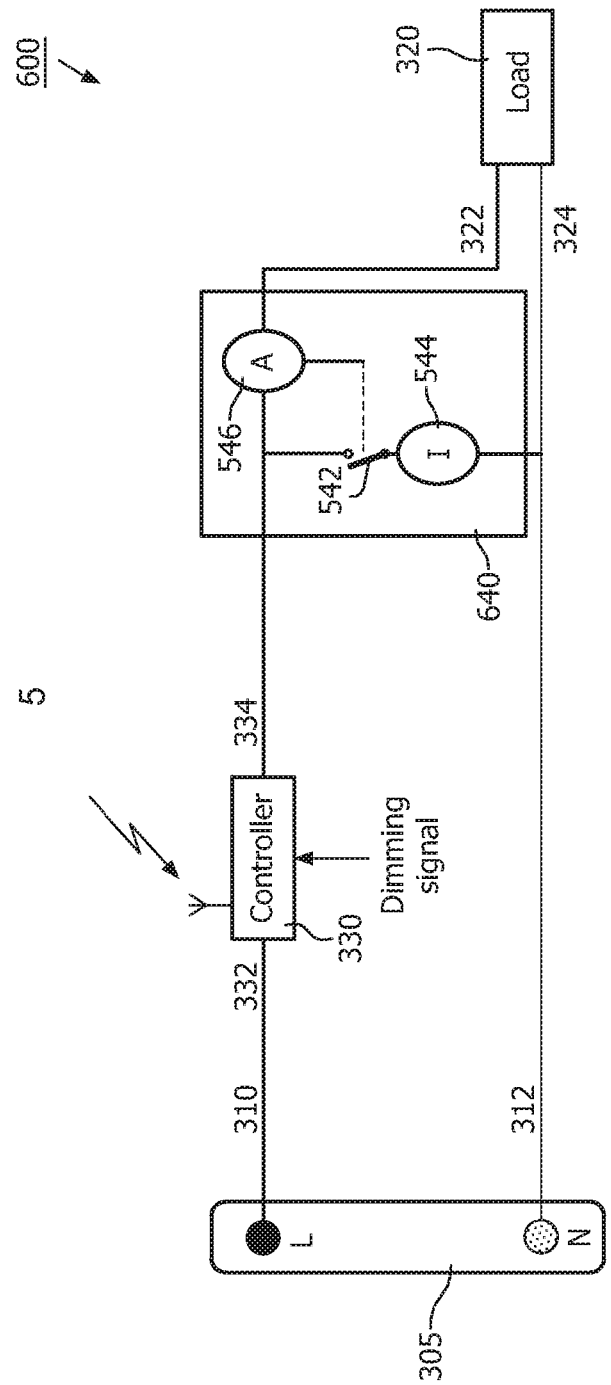
FIG. 6 is a wiring diagram for a fourth embodiment of a lighting control having a controller which does not employ a neutral wire, according to the invention.

FIG. 6 is a functional block diagram of a fourth embodiment of a lighting control system 600 having a controller which does not employ a neutral wire. The difference between lighting control system 600 and lighting control system 550 is that in lighting control system 600, current measurement device 546 of shunt device 540 is connected between output terminal 334 of electronic controller 330 and first load terminal 322 of load 320.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented byway of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

Also, reference numerals appearing in the claims in parentheses, if any, are provided merely for convenience and should not be construed as limiting the claims in any way.

The invention claimed is:

1. A system, comprising:
an electronic controller, having:
a single input terminal connected to a first power terminal of an external power source which is external to the electronic controller and which outputs an AC voltage between the first power terminal and a second power terminal thereof, and
a single output terminal connected to a first load terminal of a load which includes at least one light source and which has the first load terminal and a second load terminal, wherein the second load terminal is connected to the second power terminal of the external power source, and wherein the load is configured to receive a load voltage between the first and second load terminals and is further configured to allow a load current to flow between the first and second load terminals,
wherein the electronic controller is configured to control at least one of the load voltage and the load current so as to selectively power the load when electronic controller is in an ON state, and to disable the load when electronic controller is in an OFF state; and
a shunt device, comprising:
a series combination of a bleeding circuit in series with a switch, the series combination having a first terminal directly connected to an output terminal of the electronic controller and having a second terminal directly connected to the second power terminal of the external power source, and a switch control device that is configured to:
control the switch to connect the bleeding circuit between the output terminal of the electronic controller and the second power terminal of the external power source when the electronic controller is in an OFF state and the load is powered OFF to provide a current path for leakage current between the output terminal of the electronic controller and the second power terminal of the external power source,
control the switch to disconnect the bleeding circuit between the output terminal of the electronic controller and the second power terminal of the external power source when the electronic controller is in an ON state and the load is powered ON, and
before disconnecting the bleeding circuit between the output terminal of the electronic controller and the second power terminal of the external power source, cause a delay of at least 100 msec-after transition of the electronic controller from the OFF state to the ON state to enable the electronic controller to remain operable during an initial ON state, wherein the leakage current continues to have a current path between the output terminal of the electronic controller and the second power terminal of the external power source for the duration of the delay.

2. The system of claim 1, wherein the switch control device includes a voltage measurement device connected between the first and second load terminals and configured to measure the load voltage, and to close the switch to connect the bleeding circuit between the output terminal of the electronic controller and the second power terminal of the external power source to provide the current path between the output terminal of the electronic controller and the second power terminal of the external power source when the measured load voltage is less than a first threshold voltage while the electronic controller is in the OFF state, and to control the switch to open the switch to disconnect the bleeding circuit between the output terminal of the electronic controller and the second power terminal of the external power source when the measured load voltage exceeds the threshold voltage while the electronic controller is in the ON state.

3. The system of claim 1, wherein the switch control device includes a current measurement device configured to measure the load current and to close the switch to connect the bleeding circuit between the output terminal of the electronic controller and the second power terminal of the external power source to provide the current path between the output terminal of the electronic controller and the second power terminal of the external power source when the measured load current is less than a threshold current, and to control the switch to open the switch to disconnect the bleeding circuit between the output terminal of the electronic controller and the second power terminal of the external power source when the measured load current exceeds the threshold current.

4. The system of claim 3, wherein the current measurement device is connected between the output terminal of the electronic controller and the first load terminal.

5. The system of claim 3, wherein the current measurement device is connected between the second load terminal and the second power terminal of the external power source.

6. The system of claim 1, wherein the electronic controller includes a dimming circuit for adjusting an amount of power supplied to the load.

7. The system of claim 1, wherein the electronic controller includes a wireless receiver configured to receive a wireless signal and in response thereto to control an amount of power supplied to the load.

8. The system of claim 1, wherein the electronic controller is installed in a building at a location where a connection to the second power terminal is not provided, and wherein the shunt device is separated and spaced apart from the electronic controller by a distance of at least one foot.

9. The system of claim 8, wherein the first terminal of the load is directly connected to the output terminal of the electronic controller.

10. The system of claim 1, wherein the second terminal of the load is directly connected to the second power terminal of the external power source.

11. A method of supplying power to a load having first and second load terminals, via an electronic controller connected to an external power source which is external to the electronic controller and which external power source outputs an AC voltage between a first power terminal thereof and a second power terminal thereof, wherein the load is configured to receive a load voltage between the first and second load terminals and is further configured to allow a load current to flow between the first and second load terminals, and wherein the electronic controller is configured to control at least one of the load voltage and the load current so as to selectively power the load and disable the load, the method comprising:
- providing a series combination of a bleeding circuit in series with a switch, the series combination having a first terminal directly connected to an output terminal of the electronic controller and having a second terminal directly connected to the second power terminal of the external power source,
- operating the switch to connect the bleeding circuit between the output terminal of the electronic controller and the second power terminal of the external power source when the electronic controller is in an OFF state and the load is powered OFF, the bleeding circuit providing a current path for leakage current between the output terminal of the electronic controller and the second power terminal of the external power source,
- operating the switch to disconnect the bleeding circuit between the output terminal of the electronic controller and the second power terminal of the external power source when the electronic controller is in an ON state and the load is powered ON, and
- before disconnecting the bleeding circuit between the output terminal of the electronic controller and the second power terminal of the external power source, delaying the disconnection by least 100 msec after transition of the electronic controller from the OFF state to the ON state to enable the electronic controller to remain operable during an initial ON state, wherein the leakage current continues to have a current path between the output terminal of the electronic controller and the second power terminal of the external power source for the duration of the delay.

12. The method of claim 11, further comprising:
- measuring the load current;
- comparing the measured load current to a threshold current;
- connecting the bleeding circuit between the output terminal of the electronic controller and the second power terminal of the external power source when the measured current is less than the threshold current; and
- disconnecting the bleeding circuit between the output terminal of the electronic controller and the second power terminal of the external power source when the measured current exceeds the threshold current.

13. The method of claim 11, further comprising:
- measuring the load voltage;
- comparing the measured load voltage to a threshold voltage;
- connecting the bleeding circuit between the output terminal of the electronic controller and the second power terminal of the external power source when the measured load voltage is less than the threshold voltage; and
- disconnecting the bleeding circuit between the output terminal of the electronic controller and the second power terminal of the external power source when the measured load voltage exceeds the threshold voltage.

14. A device configured to be connected to an output terminal of an electronic controller, which in turn has a single input terminal connected to a first power terminal of an external power source which is external to the electronic controller and which external power source outputs an AC voltage between the first power terminal and a second power terminal thereof, the device comprising:
- a series combination of a bleeding circuit in series with a switch, the series combination having a first terminal configured to be directly connected to an output terminal of the electronic controller and having a second terminal configured to be directly connected to the second power terminal of the external power source; and
- a switch control device configured to detect whether the electronic controller powers a load or disables the load, the switch control device further configured to:
- connect the bleeding circuit between the output terminal of the electronic controller and the second power terminal of the external power source when the electronic controller is in an OFF and the load is powered OFF state such that the bleeding circuit provides a current path for leakage current between the output terminal of the electronic controller and the second power terminal of the external power source,
- disconnect the bleeding circuit between the output terminal of the electronic controller and the second power terminal of the external power source when the electronic controller is in an ON state and the load is powered ON, and
- before disconnecting the bleeding circuit between the output terminal of the electronic controller and the second power terminal of the external power source, delay the disconnection by least 100 msec after transition of the electronic controller from the OFF state to the ON state to enable the electronic controller to remain operable during an initial ON state, wherein the leakage current continues to have a current path between the output terminal of the electronic controller and the second power terminal of the external power source for the duration of the delay.

15. The device of claim 14, wherein the switch control device includes a voltage measurement device connected between first and second load terminals of load and configured to measure the load voltage, and to close the switch to connect the bleeding circuit between the output terminal of the electronic controller and the second power terminal of the external power source to provide a current path between the output terminal of the electronic controller and the second power terminal of the external power source when the measured load voltage is less than a threshold voltage, and to control the switch to open the switch to disconnect the bleeding circuit between the output terminal of the electronic controller and the second power terminal of the external power source when the measured load voltage exceeds the threshold voltage.

16. The device of claim 14, wherein the switch control device includes a current measurement device configured to measure the load current and to close the switch to connect the bleeding circuit between the output terminal of the electronic controller and the second power terminal of the external power source to provide a current path between the output terminal of the electronic controller and the second power terminal of the external power source when the measured load current is less than a threshold current, and to control the switch to open the switch to disconnect the bleeding circuit between the output terminal of the electronic controller and the second power terminal of the external power source when the measured load current exceeds the threshold current.

17. The device of claim 14, wherein the electronic controller is installed in a building at a location where a connection to the second power terminal is not provided, and wherein the device is separated and spaced apart from the electronic controller by a distance of at least one foot.

\* \* \* \* \*